United States Patent
Imai et al.

(10) Patent No.: US 6,833,044 B2
(45) Date of Patent: Dec. 21, 2004

(54) SOLVENT-FREE TWO-COMPONENT CURABLE ADHESIVE COMPOSITION

(75) Inventors: Akihiro Imai, Osaka (JP); Kazuaki Imamura, Osaka (JP); Taiji Morimoto, Osaka (JP)

(73) Assignee: Mitsui Takeda Chemicals, Inc., Tokyo (JP)

( * ) Notice: Subject to any disclaimer, the term of this patent is extended or adjusted under 35 U.S.C. 154(b) by 334 days.

(21) Appl. No.: 10/082,216

(22) Filed: Feb. 26, 2002

(65) Prior Publication Data

US 2002/0157789 A1 Oct. 31, 2002

(30) Foreign Application Priority Data

Feb. 27, 2001 (JP) ........................................ 2001-052353

(51) Int. Cl.[7] ............................... B32B 31/12; C09J 5/02
(52) U.S. Cl. ............................... 156/331.4; 156/331.7; 156/332; 156/324; 524/589; 528/52
(58) Field of Search ......................... 156/331.4, 331.7, 156/332, 324; 524/589; 528/52

(56) References Cited

U.S. PATENT DOCUMENTS

| 5,166,302 A | * | 11/1992 | Werner et al. ................. 528/67 |
| 5,869,593 A | * | 2/1999 | Helmeke et al. ............... 528/83 |
| 5,880,167 A | | 3/1999 | Krebs et al. ................... 521/155 |
| 6,191,212 B1 | * | 2/2001 | Kube ............................. 524/590 |

FOREIGN PATENT DOCUMENTS

| JP | 11-148066 | 6/1999 |
| JP | 11-181393 | 7/1999 |

* cited by examiner

*Primary Examiner*—Sam Chuan Yao
(74) *Attorney, Agent, or Firm*—Wenderoth, Lind & Ponack, L.L.P.

(57) ABSTRACT

The solvent-free two-component adhesive composition of the present invention is prepared by a polyol component (A) and a polyisocyanate component (B), wherein the composition comprises at least one polyol component having crystallinity and selected from the group consisting of a polyester polyol, a polyether polyol, a polycarbonate polyol and a polyurethane polyol in an amount of 3 to 50% by weight relative to the total weight of the components (A) and (B). The adhesive composition has the initial viscosity of about 100 to 1,500 mPa·s (in particular, 100 to 1,000 mPa·s) at 70° C. immediately after the components (A) and (B) are mixed together, and the increasing ratio of viscosity after the composition is stood at 70° C. for 10 minutes to the initial viscosity of 120% or less. According to the present invention, a composite laminated film having the good external appearance can be produced simply and effectively.

16 Claims, 1 Drawing Sheet

SOLVENT-FREE TWO-COMPONENT CURABLE ADHESIVE COMPOSITION

FIELD OF THE INVENTION

The present invention relates to a solvent-free curable adhesive composition and a process of lamination with use of the adhesive composition. In further detail, the present invention relates to a solvent-free two-component curable adhesive composition for lamination useful in producing materials for packaging food, necessaries of life, and others, and to a process of lamination.

BACKGROUND OF THE INVENTION

Currently, composite laminated films have been widely used in the field of packaging materials, and these composite films are produced by bonding various plastic films and metal foil, and others by using an adhesive. As the adhesive for lamination, an organic solvent-based two-component curable adhesive comprising a mixture of an organic polyisocyanate compound and a polyester polyol, a polyether polyol, a polyurethane polyol or any mixture of these polymers has been used.

However, in recent years, for improving working environment and regulation of the use of solvents, the organic solvent-based adhesives have been replaced gradually with solvent-free adhesives in the production of composite laminated films. As such solvent-free adhesives for lamination, an adhesive composition comprising a polyol component and a polyisocyanate component has been used.

Composite laminated films using solvent-free adhesive compositions are produced with use of a laminator (for a solvent-free adhesive). A process for producing composite laminated films with use of the laminator is illustrated with referring to FIG. 1.

A polyol component and a polyisocyanate component are usually supplied from tanks 1 and 2, respectively, and the components are mixed by a mixer 3 before the components reach at coating part (area) of a laminator. The resultant adhesive 4 is supplied between a doctor roll 5 and a metering roll 6 which are rotated in the opposite direction each other. The adhesive 4 is transferred from the metering roll 6 to a coating roll 7, and is coated on a film 9 which is supplied between the coating roll 7 and a impression roll 8. The film 9 on which the adhesive is coated, and the other film 10 are supplied between a laminating roll 11 and a nip roll 12, to bond or adhere the coating surface of the film 9 with the film 10, and then rolled up by a winding unit to produce a composite laminated film 13 having two layers structure. Furthermore, if necessary, a composite laminated film composed of three or more layers may be sometimes produced in the same manner. The respective shapes of coating parts of the doctor roll 5, the metering roll 6 and the coating roll 7 and the impression roll 8 are different depending on equipment, and this figure shows just one embodiment thereof.

The conventional solvent-free adhesives, depending on the laminating conditions, is liable to cause deterioration (detraction) of the external appearance due to unevenness of coating surface caused by forcibly peeling the coating layer on the film 9 from the coating roll 7 or non-uniformity of thickness of the coated adhesive. In particular, there has propensity to cause deterioration of the external appearance when laminating at high speed and laminating a film having high rigidity such as polyethylene terephthalate film and others. Thus, a low coating speed (e.g., 100 m/minute or less of a lamination speed) is required, and causes reduction in working efficiency.

Moreover, in the case of lamination with the conventional solvent-free adhesives by a laminator, in most cases, foam comes to be contained in the adhesive accumulated between the doctor roll 5 and the metering roll 6, the foam is transferred to the coating layer as such on the film, and the film is laminated. As a result, in most cases, the initial external appearance of the composite laminated film makes worse.

Moreover, usually, for accelerating reaction of an isocyanate group with a hydroxyl group and improving conformability of the adhesive to the film after lamination as well, the composite laminated film often allows to warm at 30 to 60° C. for one or more days (hereinafter, referring as aging (or aging step)). However, when the external appearance of the film at the time immediately after lamination deteriorates and remarkably differs from that of the film at the time after aging step, quality (appearance) of the composite laminated film as the final product obtained from aging step can not be evaluated (imaged) immediately after laminating step. Furthermore, as a lamination speed is faster, large foam generated in the film remains intact. Part of the foam remains without disappearance even after aging step, as a result, deterioration of the external appearance sometimes occurs in the film.

On the other hand, a coating amount and an initial adhesive strength (or adhesive properties) depend on the viscosity of the solvent-free adhesive. Thus, for overcoming the above-mentioned problems, if the viscosity of the adhesive allows lower, it becomes difficult to keep an amount of coating and the initial adhesive strength. As a result, there has propensity to deteriorate the external appearance due to blur and tunneling (embossment) to the composite laminated film, and there has propensity to delaminate if three or more layer are laminated.

Japanese Patent Application Laid-open No. 181393/1999 (JP-11-181393A) discloses a solvent-free two-component curable adhesive composition comprising a hydroxyl group-containing compound such as a crystalline polymer polyol, and an isocyanate-containing compound, wherein a mixture of both compounds is solid or semisolid state. Even if the adhesive composition is used, however, when a film having high rigidity is laminated at high speed, the external appearance of the composite laminated film is remarkably deteriorated.

SUMMARY OF THE INVENTION

Therefore, it is an object of the present invention to provide a solvent-free curable adhesive composition (a solvent-free two-component curable adhesive composition) capable of producing a composite laminated film having the superior external appearance simply and efficiently, and a process of lamination using such a adhesive composition.

It is another object of the present invention to provide a solvent-free two-component curable adhesive composition capable of having an improved initial adhesive strength, and a process of lamination using such a adhesive composition.

It is further another object of the present invention to provide a solvent-free two-component curable adhesive composition and a process of lamination capable of producing a composite laminated film having the good external appearance at the time both immediately after lamination and after aging step, even when laminating at high speed or laminating with a film having high rigidity such as polyethylene terephthalate.

The inventors of the present invention made intensive studies to achieve the above objects, and finally found that use of a component containing a specific crystalline polyol component at certain ratio as a polyol component and/or a polyisocyanate component enables to produce a composite laminated film having high initial adhesive strength and having superior appearance even when laminated at high speed simply. The present invention was accomplished based on the above findings.

That is, the solvent-free two-component curable adhesive composition of the present invention comprises (A) a polyol component and (B) a polyisocyanate component, wherein at least one component of the components (A) and (B) comprises at least one polyol component having crystallinity at room temperature and selected from the group consisting of a polyester polyol, a polyether polyol, a polycarbonate polyol and a polyurethane polyol, and an amount of the crystalline polyol component is 3 to 50% by weight (particularly, 3 to 45% by weight) relative to the total weight of the components (A) and (B). The polyol component may be crystalline, or the crystalline polyol component may be contained in the polyol component and/or the isocyanate component as a constructive unit or segment. The composition has an initial viscosity of about 100 to 1,500 mPa·s (e.g., about 200 to 1,500 mPa·s) at 70° C. immediately after the components (A) and (B) are mixed together, and an increasing ratio of the viscosity after the composition is stood at 70° C. for 10 minutes to the initial viscosity of 120% or less (e.g., 110% or less). Moreover, the concentration of aromatic rings (as a constituting unit) in the total weight of the components (A) and (B) may be 0.2 to 2.8 mmol/g (particularly, 0.4 to 2.6 mmol/g).

In the composition, the component (A) may comprise polyester polyol obtainable from a polybasic acid (e.g., an aromatic dicarboxylic acid and an aliphatic dicarboxylic acid) and a polyol component (e.g., an alkanepolyol and a polyether polyol). A number average molecular weight of the component (A) may be about 400 to 5,000 (for example, about 400 to 4,000). The component (A) may further comprise an alkanepolyol and a polyether polyol, and others. The component (B) has a plurality of terminal isocyanate groups, and may be the followings (B1), (B2), and others: (B1), a reaction product of a polyol component (e.g., an alkanepolyol, a polyester polyol, a polyether polyol, a polycarbonate polyol and a polyurethane polyol) and a polyisocyanate [e.g., an araliphatic diisocyanate and a biphenyl-series diisocyanate]; and (B2) apolyisocyanate (e.g., a aliphatic diisocyanate) derivative.

The crystalline polyol component may be composed of at least one member selected from the followings (i) and (ii): (i) a polyester polyol obtainable from at least one member selected from the group consisting of an aromatic dicarboxylic acid and an aliphatic dicarboxylic acid, and at least one polyol component selected from the group consisting of an alkanepolyol and a polyether polyol; and (ii) a polyether polyol. A number average molecular weight of the crystalline polyol component may be about 400 to 4,000. Moreover, the above-mentioned composition may comprise an antifoaming agent and/or a foam stabilizer, an adhesion improving agent (e.g., a coupling agent, an oxygen acid of phosphorus, and an epoxy compound or resin), and others.

A composite film, without deterioration of the external appearance, can be obtainable with use of the composition, even if the film is laminated at high speed (e.g., 100 m/minute or more of a lamination speed). Moreover, a high quality composite film can be obtainable with use of the composition, even when high rigidity films (particularly, a plurality of films including a polyalkylene arylate-series resin film) are laminated.

The present invention also includes a process for laminating a plurality of films with the use of the composition.

The present invention further includes use of the composition for producing a laminated film (laminate).

DETAILED DESCRIPTION OF THE INVENTION

[(A) Polyol component]

Figure 1:
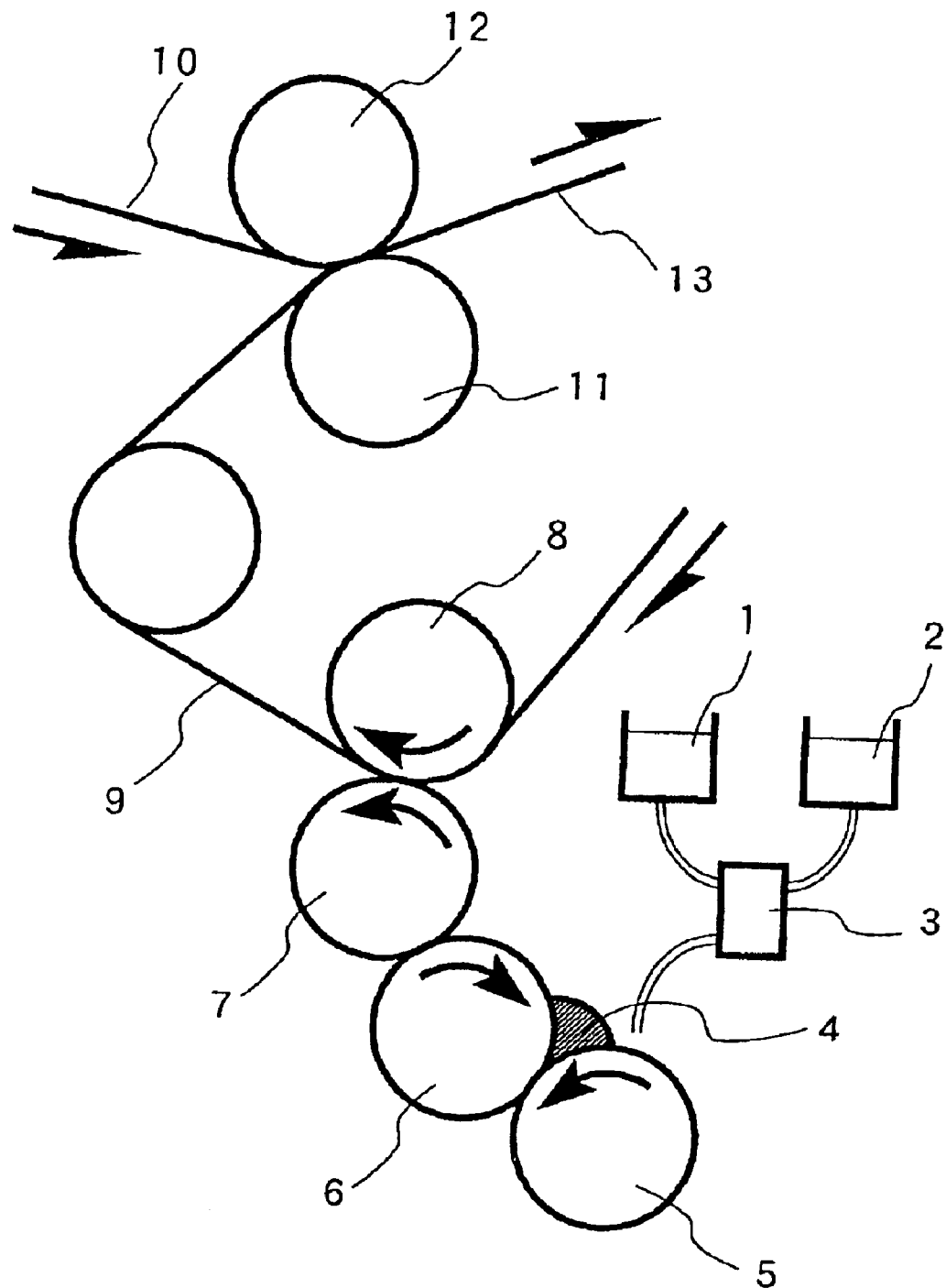
FIG. 1 shows a schematic view of a solvent-free laminator for explaining a process for producing a composite laminated film.

A polyol component is exemplified by an alkanepolyol, a polyether polyol, a polyester polyol, a polycarbonate polyol, a polyurethane polyol, etc.

The alkanepolyol includes for example an alkanediol (e.g., a $C_{2-40}$alkanediol or an aliphatic diol of a low molecular weight such as ethylene glycol, propylene glycol, 1,4-butanediol, 1,3-butanediol, 1,2-butanediol, 2-methyl-1,3-propanediol, 1,5-pentanediol, 3-methyl-1,5-pentanediol, 2,4-diethyl-1,5-pentanediol, 2,2,4-trimethylpentane-1,3-diol, 1,6-hexanediol, neopentyl glycol, 1,5-heptanediol, 1,7-heptanediol, 3,3'-dimetylolheptane, 1,8-octanediol, 1,9-nonanediol, 1,10-decanediol, 1,11-undecanediol, 1,12-undecanediol, 12-hydroxystearyl alcohol, and a hydrogenated dimer diol); an aromatic diol (e.g., bisphenol A, bishydroxyethylterephthalate, catechol, resorcin, hydroquinone, 1,3- or 1,4-xylylenediol); an alicyclic diol (e.g., hydrogenated bisphenol A, hydrogenated xylylenediol, cyclohexanediol, cyclohexanedimethanol); a polyol having three or more hydroxyl groups per molecule (e.g., glycerin, trimethylolpropane, pentaerythritol, sorbitol), and others. These alkanepolyols can be used singly or in combination. Among these alkanepolyols, the preferred alkanepolyol includes a $C_{2-10}$alkylenediol such as ethylene glycol, propylene glycol, 1,3-butanediol, 1,4-butanediol, neopentyl glycol and 1,6-hexanediol, and particularly, a $C_{2-6}$alkylenediol is preferred.

Exemplified as the polyether polyol is a homo- or copolymer of alkylene oxide [e.g., a homo- or copolymer of a $C_{2-5}$alkylene oxide (e.g., a $C_{2-5}$alkylene oxide such as ethylene oxide, propylene oxide, butylene oxide, tetrahydrofuran, 3-methyltetrahydrofuran, and an oxetane compound)], an alkylene oxide adduct of bisphenol A or hydrogenated bisphenol A, and others. Exemplified as homopolymer of alkylene oxide is, for example, diethylene glycol, triethylene glycol, polyethylene glycol, dipropylene glycol, polypropylene glycol, polytrimethyleneether glycol, polytetramethyleneether glycol. These polyether polyols can be used singly or in combination. Among these polyether polyols, the preferred polyetherpolyol includes a poly $C_{2-4}$alkylene glycol such as diethylene glycol, triethylene glycol, polyethylene glycol, dipropylene glycol, tripropylene glycol, polyproplylene glycol, ditrimethyle-neether glycol, tritrimethyleneether glycol, polytrimethyle-neether glycol, polytetramethyleneether glycol.

The polyester polyol includes one that is obtained by a conventional esterification reaction, that is, a condensation reaction between a polybasic acid, and the alkanepolyol and/or the polyether polyol; a transesterification reaction between an alkyl ester of a polybasic acid, and the alkanepolyol and/or the polyether polyol; a ring-opening polymerization reaction between a lactone, and at least one member selected from the alkanepolyol, the polyether polyol and polybasic acid; and others. These polyester polyols can be used singly or in combination.

Examples of the polybasic acid or its alkyl ester include an aliphatic polyvalent carboxylic acid such as succinic acid, glutaric acid, adipic acid, pimelic acid, cork acid, azelaic acid, sebacic acid, dodecanoic diacid, and dimeric acid [for example, an aliphatic dicaroxylic acid such as a $C_{4-30}$ (preferably, $C_{4-12}$) aliphatic dicaroxylic acid]; an alicyclic dicarboxylic acid such as hexahydrophthalic acid and tetrahydrophthalic acid; an aromatic polyvalent carboxylic acid such as phthalic acid, isophthalic acid, terephthalic acid, trimellitic acid and pyromellitic acid (particularly, an aromatic dicarboxylic acid); a dialkyl ester thereof (e.g., $C_{1-6}$alkyl ester), etc. The polybasic acid or its alkyl ester can be used singly or in combination.

As the lactone, there may be mentioned a $C_{3-14}$ lactone such as ε-caprolactone, δ-valerolactone, β-methyl-δ-valerolactone, and others. The lactone can be used singly or in combination.

Exemplified as a polycarbonate poloyol is a polycarbonate diol obtained through the reaction between a short chain dialkyl carbonate (e.g., a $C_{1-4}$alkyl carbonate such as dimethyl carbonate and diethyl carbonate) and at least one member selected from the group consisting of the alkanepolyol, the polyether polyol, the polyester polyol, etc. The polycarbonate poloyol can be used singly or in combination.

The polyurethane polyol includes, for example, a polyurethane polyol obtained by a reaction of a polyisocyanate with at least one member selected from the group consisting of the alkanepolyol, the polyether polyol, the polyester polyol, the polycarbonate polyol, and others. The polyurethane polyol can be used singly or in combination.

The polyisocyanate includes a polyisocyanate monomer that is ordinarily employed in the production of polyurethane, and a derivative of the monomer.

Included among the polyisocyanate monomer is, for example, an aromatic diisocyanate, an araliphatic diisocyanate, an alicyclic diisocyanates, and an aliphatic diisocyanate. The polyisocyanate monomer may be used alone or in combination.

Examples of the aromatic diisocyanate include m- or p-phenylene diisocyanate and mixture thereof, 2,4- or 2,6-trilene diisocyanate and mixture thereof (TDI), 4,4'-, 2,4'-or 2,2'-diphenylmethane diisocyanate and mixture thereof (MDI), 4,4'-toluidine diisocyanate (TODI), 4,4'-diphenylether diisocyanate, 4,4'-diphenyl diisocyanate and 1,5-naphthalene diisocyanate (NDI). The aromatic diisocyanate may be used singly or in combination.

The araliphatic diisocyanate includes, for example, 1,3- or 1,4-xylylene diisocyanate and mixture thereof (XDI); 1,3- or 1,4-tetramethylxylylene diisocyanate and mixture thereof (TMXDI); and ω,ω'-diisocyanate-1,4-diethylbenzene. The araliphatic diisocyanate may be used singly or in combination.

Exemplified as the alicyclic diisocyanate is, for example, 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate: IPDI), 4,4'-, 2,4'- or 2,2'-dicyclohexylmethane diisocyanate and mixture thereof (hydrogenated MDI), methyl-2,4-cyclohexane diisocyanate, methyl-2,6-cyclohexane diisocyanate, 1,3- or 1,4-bis (isocyanatemethyl)cyclohexane and mixture thereof (hydrogenated XDI). The alicyclic diisocyanate may be used singly or in combination.

As the aliphatic diisocyanates, for example, there are mentioned trimethylene diisocyanate, tetramethylene diisocyanate, hexamethylene diisocynate (HDI), pentamethylene diisocyanate, 1,2-, 2,3- or 1,3-butylene diisocyanate, and 2,4,4- or 2,2,4-trimethylhexamethylene diisocyanate. The aliphatic diisocyanate may be used singly or in combination.

Exemplified as the derivative of polyisocyanate monomers includes a polymeric or oligomeric product (e.g., a dimer, a trimer, a pentamer, a heptamer) of the polyisocyanate monomer mentioned above; a urethane (e.g., a urethane containing a monool or polyol in which part of isocyanate groups of the polyisocyanate monomer, or the polymeric or oligomeric product thereof is modified or reacted with a monool or polyol); a biuret (e.g., a biuret-containing polyisocyanate produced by the reaction of the above-mentioned polyisocyanate monomer with water); an allophanate (e.g., an allophanate-containing polyisocyanate produced by the reaction of the above-mentioned polyisocyanate monomer with a monool or polyol component); an urea (e.g., an urea-containing polyisocyanate produced by the reaction of the above-mentioned polyisocyanate monomer with diamine); and an oxadiazinetrione (e.g., an oxadiazinetrione-containing polyisocyanate produced by the reaction the above-mentioned polyisocyanate monomer with carbonic acid gas, etc). The derivative may be used singly or in combination.

When a polyurethane polyol is used as a polyol component, there can be used a terminal hydroxypolyurethane having an equivalent ratio of the isocyanate group of the polyisocyanate component to the hydroxyl group of the polyol component (NCO/OH) of smaller than 1.

The polyol component may be used singly or in combination with the same or different kinds.

As the polyol component (A), among these polyol components, it is preferred to at least (or essentially) contain a polyester polyol which is obtained from at least one polybasic acid selected from the group consisting of an aromatic dicarboxylic acid (in particular, dicarboxylic acid such as isophthalic acid, terephthalic acid, etc) or a dialkyl ester thereof, and an aliphatic dicarboxylic acid (in particular, linear dicarboxylic acid); and at least one polyol selected from the alkanepolyol and the polyether polyol. The polybasic acid or the polyol each may be used singly or in combination. The polyester polyol itself may be also used singly or in combination.

Among them, as the polyesther polyol in polyol components, a polyesther polyol which is obtained from a polybasic acid (e.g., adipic acid, terephthalic acid, a dialkylesther of terephthalic acid, isophthalic acid) and a polyol component (e.g., 1,4-butanediol, 1,3-butanediol, 1,6-hexanediol, ethylene glycol, diethylene glycol and neopentyl glycol) is preferable.

Furthermore, as the polyol component (A), the polyol component further containing an alkanepolyol (preferably, a $C_{2-6}$ alkylene diol such as 1,4-butanediol and 1,6-hexanediol) and/or a polyether polyol (preferably, a poly $C_{2-4}$ alkylene glycol such as diethylene glycol) is also preferable. The ratio by weight of the polyester polyol to the alkanepolyol and/or the polyether polyol (former/latter) is about 99/1 to 10/90, preferably about 95/5 to 20/80, and more preferably about 90/10 to 30/70.

A crystalline polyol component may or may not be contained in the polyol component (A). When a crystalline polyol component is not contained in the polyol component (A), it is sufficient that the crystalline polyol component is contained in the polyisocyanate component (B) such that an amount of the crystalline polyol component is 3 to 50% by weight relative to total weight of the components (A) and (B). Moreover, the polyol component (A) itself may be also crystalline or noncrystalline.

The crystalline polyol component includes a polyol having crystallinity at room temperature (about 15 to 25° C.), such as a polyester polyol, a polyether polyol, a polycarbonate polyol and a polyurethane polyol. The preferred crystalline polyol component is, for example, a crystalline polyester polyol and a crystalline polyether polyol. The crystalline polyol component still has crystallinity at or below room temperature.

The crystalline polyester polyol is usually obtained from a polyvalent (or di) carboxylic acid selected from an aromatic dicarboxylic acid (e.g., an aromatic dicarboxylic acid such as terephthalic acid and isophthalic acid) or a dialkylester thereof and an aliphatic dicarboxylic acid (e.g., an aliphatic dicarboxylic acid such as succinic acid, glutaric acid, adipic acid, pimelic acid, cork acid, azelaic acid, sebacic acid, dodecanoic diacid and dimeric acid), and a polyol selected form the alkanepolyol and the polyether polyol. Among the above crystalline polyester polyol, the particularly preferred polyester polyol is one obtained from a $C_{4-12}$ aliphatic dicarboxylic acid (in particular, a linear $C_{6-10}$ aliphatic dicarboxylic acid such as adipic acid, azelaic acid and sebacic acid), and a polyol selected from the group consisting of an alkanediol (in particular, a symmetric or linear $C_{2-6}$ alkanediol such as ethylene glycol, 1,4-butanediol, neopentyl glycol and 1,6-hexanediol) and a polyether diol (e.g., a symmetric or linear poly $C_{2-4}$ alkylene glycol such as polyethylene glycol, polytrimethyleneether glycol and polytetramethyleneether glycol). The above-mentioned dicarboxylic acids or polyols each may be used singly or in combination.

For example, polyethylene glycol, polytriethyleneether glycol and polytetramethyleneether glycol can be used as the crystalline polyether polyol. Among the crystalline polyether polyol, polytetramethyleneether glycol is particularly preferred.

The number average molecular weight of the crystalline polyol component is about 400 to 5,000, preferably about 400 to 4,000, and more preferably about 450 to 3,000.

[Polyisocyanate component (B)]

Exemplified as a polyisocyanate component (B) is the above-mentioned polyisocyanate monomer and a derivative thereof, a terminal isocyanate group-containing oligomer, and others.

In particular, preferred as the derivative of polyisocyanate monomers is component containing: a polymer or oligomer (e.g., a dimer, a trimer, a pentamer, a heptamer) of the polyisocyanate monomer mentioned above; a polymer or oligomer which part of isocyanate groups is modified or reacted with a monool (a $C_{1-6}$ alcohol such as t-butanol) or a polyol (a polyol such as an alkanediol, a polyoxyalkylene glycol, trimethylolpropane and glycerin); a biuret; and an allophanate.

The terminal isocyanate group-containing oligomer includes a reaction product of the polyol component with the polyisocyanate monomer and/or a derivative thereof. Used as the polyol component can be the above-mentioned alkanepolyol (e.g., ethylene glycol, propylene glycol, trimethylolpropane and glycerin), the above-mentioned polyether polyol (e.g., diethylene glycol and polypropylene glycol), the above-mentioned polyester polyol, the above-mentioned polycarbonate polyol, the above-mentioned polyurethane polyol, and others. The polyol component may be used singly or in combination.

It is sufficient that the terminal isocyanate group-containing oligomer have an equivalent ratio of the isocyanate group of the polyisocyanate component to the hydroxyl group of the polyol component (NCO/OH) exceeding 1. The ratio is preferably about 1.2 to 5, and more preferably about 1.3 to 4 (e.g., about 1.4 to 3).

Among the polyisocyanate component, (B1) a reaction product of the polyol component with the polyisocyanate, or (B2) the polyisocyanate derivative is preferable. A reaction product of the polyol component with an araliphatic diisocyanate (e.g., XDI) and/or a biphenyl-series diisocyanate) (e.g., a bis(4-isocyanatophenyl) $C_{1-6}$alkane and bis(4-isocyanatophenyl) ether, particularly MDI); or a derivative of a aliphatic diisocyanate (particularly, HDI) is particularly preferred. Furthermore, as the derivative of an aliphatic diisocyanate, an aliphatic diisocyanate having a isocyanurate ring (triazine ring), a biuret backbone or an allophanate backbone is particularly preferred.

As exemplified the polyisocyanate component having crystallinity at room temperature can be a reaction product of the above-mentioned crystalline polyol component with the above-mentioned polyisocyanate component, and others.

The isocyanate component may be used singly or in combination with the same or different kinds.

[Solvent-free two-component curable adhesive composition]

The solvent-free two-component curable adhesive composition of the present invention can be obtained by blending the components (A) and (B). The composition comprises the crystalline polyol component at the state that the components (A) and (B) have been blended. When the composition is used for producing a composite laminated film, the initial adhesive strength and the external appearance at the time immediately after lamination becomes good.

The crystalline polyol component may be contained in any one of the components (A) and (B), or may be contained in both the components (A) and (B). Moreover, the crystalline polyol component which has reacted with the other component (e.g., an isocyanate group) may be contained. Furthermore, even if the components (A) and (B) themselves do not have crystallinity, it is sufficient that the crystalline component is contained. Also, A reaction product of a noncrystalline polyol component with a polyisocyanate (e.g., MDI or HDI) may have crystallinity as a result.

The amount of the crystalline polyol component is, relative to the total weight of the components (A) and (B), about 3 to 50% by weight, preferably about 3 to 45% by weight, and more preferably about 5 to 40% by weight (in particular, about 10 to 40% by weight). In the case where the content of the crystalline polyol component is too much, the deterioration of the external appearance occurring at the time immediately after lamination can not be improved and the deterioration still remains even after aging step to come to be worse by contraries. On the other hand, in the case where the content of the crystalline polyol component is too small, no effect of the crystalline polyol component is shown, no composite laminated films having good initiate external appearance can be obtained, and the excellent initiate adhesive strength can not be shown.

In particular, when an amount of the crystalline polyol component is 25% or more by weight relative to the total weight of the composition and the condition concerned with viscosity mentioned below is satisfied, a composite laminated film having the very good external appearance can be obtained in any constructions of the film even upon high speed lamination, without limitation of form of adhesives.

In the composition of the present invention, the viscosity of the mixture at 70° C. immediately after the components (A) and (B) are mixed together is about 100 to 1,500 mPa·s, preferably about 200 to 1,500 mPa·s, and more preferably about 300 to 1,500 mPa·s. In the case where an antifoaming agent and/or a foam stabilizer mentioned below is not used, the preferred viscosity is 1,000 mPa·s or less (for example, about 100 to 1,000 mPa·s, preferably about 200 to 1,000 mPa·s, and more preferably about 300 to 1,000 mPa·s). As the viscosity is higher, the deterioration of the external appearance of the early stage and that of after aging step sometimes occur, particularly in the case of producing a composite laminated film containing a film having high rigidity. On the other hand, if the viscosity is too low, the delamination due to a weak initial cohesive ability (cohesive force) will sometimes occur. Incidentally, in the present invention, "the initial viscosity of the mixture immediately after the components (A) and (B) are mixed together" refers to that of the mixture within two minutes after the components are mixed homogeneously or uniformly.

In the composition of the present invention, the rate or ratio of increase in the viscosity after the mixture of the components (A) and (B) is stood at 70° C. for 10 minutes is 120% or less (about 5 to 120%) relative to the viscosity (initial viscosity) immediately after the mixture is mixed together. The rate of increase is preferably 110% or less (about 10 to 110%), and more preferably 105% or less (about 20 to 105%). In the case where the rate of increase in the viscosity is too high, the reaction of components (A) and (B) proceeds too fast. As the result, in the most cases, the external appearance of the film after aging step is just like the initial external appearance, and the external appearance sometimes is adversely affected.

In the composition of the present invention, the concentration of aromatic rings in the total weight of the components (A) and (B) is about 0.2 to 2.8 mmol/g, preferably about 0.4 to 2.6 mmol/g, and further preferably about 0.6 to 2.6 mmol/g. When the concentration of aromatic rings is too high, the adhesive becomes too rigid and as a result the external appearance of the film immediately after lamination and that of the film after aging step is deteriorated. When the concentration of aromatic rings is too low, there is the possibility of delamination due to a weak initial cohesive ability depending on the combination of the films to be laminated.

Regarding to an amount of the components (A) and (B) to be blended, an equivalent ratio of the isocyanate group of the component (B) to the hydroxyl group of the component (A) (NCO/OH) can be selected within the range of about 0.4 to 20, preferably about 0.5 to 10, and more preferably about 0.5 to 5.

[Additives]

The solvent-free two-component curable adhesive composition of the present invention may contain an antifoaming agent or a foam stabilizer. When a solvent-free adhesive is laminated with the use of a laminator for a solvent-free adhesive, there has a possibility that: foam gets mixed with the adhesive during coating step; non-wet parts (areas or spots) appear like dot shape (dot pattern) in the composite laminated film; and the parts remains even at the time after aging step. As a result, the quality of the external appearance will be reduced in some cases. When an antifoaming agent is added, the agent prevents such foam from generating, the initial external appearance can be improved such that the appearance at the time after aging step can be also improved. Moreover, addition of a foam stabilizer enables foam to fine uniformly and the initial external appearance can be improved such that the appearance at the time after aging step can be also improved. Incidentally, it is very effective that the antifoaming agent and the foam stabilizer are added in the case where the viscosity of the mixture at 70° C. immediately after the components (A) and (B) are mixed together is over 1,000 mPa·s.

It is sufficient that the antifoaming agent and the foam stabilizer disperse or mix in the adhesive composition homogeneously or uniformly. The antifoaming agent includes, for example, a silicone-series antifoaming agent such as silicone oil (high molecular weight polydimethylsiloxane) and modified silicone oil (for example, amino group-introduced silicone oil, (poly)oxyalkylene group-introduced silicone oil, carboxyl group-introduced silicone oil), nonionic surfactant (for example, a polyoxyethylene $C_{1-22}$alkylether, a polyoxyethylene $C_{1-22}$alkylphenylether), kerosene, mineral oil, and others, without any restriction.

The foam stabilizer includes, for example, low molecular weight polydimethylsiloxane, a $C_{1-10}$alcohol (e.g., ethyl alcohol, isopropyl alcohol and octyl alcohol), an alicyclic alcohol (e.g., cyclohexanol), a polyvalent alcohol (e.g., ethylene glycol and propylene glycol), an unsaturated aliphatic alcohol (e.g., acetylene glycol).

Used as the antifoaming agent and the foam stabilizer is usually silicone oil or modified silicone oil. The antifoaming agent and the foam stabilizer can be used singly or in combination.

An amount of the antifoaming agent and/or the foam stabilizer is, relative to 100 parts by weight of the component (A), usually about 0.001 to 1 part by weight, preferably about 0.003 to 0.5 part by weight, and further preferably 0.005 to 0.5 part by weight. In the case where the amount of the antifoaming agent and/or the foam stabilizer are too small, the antifoaming and/or foam size-controlling effect do not appear enough. On the contrary, in the case where the antifoaming agent and/or the foam stabilizer are too much, there has propensity to cause defection due to wetting upon coating of the adhesive and as a result the external appearance of the composite laminated film sometimes deteriorates.

The composition of the present invention may contain an adhesion improving agent. Exemplified as the adhesion improving agent is a coupling agent (silane coupling agent, titanium coupling agent, particularly silane coupling agent); an oxygen acid of phosphorus (e.g., orthophosphoric acid, metaphosphoric acid, polyphosphoric acid) or a derivative thereof; epoxy compound or resin; and others. The adhesion improving agent can be used singly or in combination.

The silane coupling agent has at least an alkoxysilyl group (particularly, a $C_{1-2}$alkoxysilyl group), and may have such a functional group as an isocyanate group, a polymerizable group (e.g., vinyl group, (meth)acryloyl group), a glycidyl group (including epoxy group), carboxyl group, an N-substituted amino group.

Exemplified as the epoxy compound or resin is glycidyl ether-based epoxy resin (e.g., bisphenol-based epoxy resin such as bisphenol A, F and AD types, bromine-containing epoxy resin, phenol or cresol-based epoxy resin), cyclic aliphatic epoxy resin, glycidyl ester-based epoxy resin, glycidylamine-based epoxy resin, and heterocyclic epoxy resin. Bisphenol-based epoxy resin (particularly, bisphenol A-based epoxy resin) is usually employed.

An amount of each adhesive improving agent is, per 100 parts by weight of the component (A), usually about 0.001 to 5 parts by weight, preferably about 0.01 to 5 parts by weight, and more preferably about 0.03 to 3 parts by weight. Also, the total weight of the adhesive improving agent can be selected within the above-described range. In the case that the amount of the adhesive improving agent is too small, the effects of the adhesiveness are hardly improved. If the amount is too much and the adhesive improving agent is low molecular weight, for example in a laminate of a plastic film and a metal foil, not only the adhesive improving agent but also the adhesive along with the adhesive improving agent is drawn into the pinholes of the metal foil. As the result, the composite laminated film shows the tendency of blocking.

The composition of the present invention may include a catalyst for controlling a curing reaction. A catalyst for excessively accelerating a reaction of hydroxyl group with isocyanate group (e.g., tin-series catalyst such as dibutyltindilaurate) may be added under the condition that the rate of increase in the viscosity of the composition containing the components (A) and (B) is in the range of less than 120%.

Further, as other additive(s), to the composition may be added: a coatability improving agent; a leveling agent; a stabilizer typified by an antioxidant and an ultraviolet ray absorber, etc; a plasticizer; a surfactant; a filler; a coloring pigment; organic or inorganic particulates; and others.

[Process of Lamination]

The solvent-free curable adhesive composition (i.e., solvent-free two-component curable adhesive composition) of the present invention is useful for laminating films such as a metal foil and a plastic film in any combination. In particular, the adhesive composition of the present invention has high adhesive strength, and a composite laminated film having the good external appearance can be obtained even when laminated at high speed. Accordingly, the adhesive composition of the present invention is suitable for laminating at such high speed as about 100 or more m/minute (e.g., about 100 to 500 m/minute), preferably about 150 or more m/minute (e.g., about 150 to 400 m/minute), and further preferably about 200 or more m/minute (e.g., about 200 to 350 m/minute).

Exemplified as the plastic film is a film composed of an olefinic polymer (e.g., polyethylene, polypropylene); a polyester-series polymer (e.g., polyalkylene arylate such as polyethylene terephthalate, polybutylene terephthalate, polyethylene naphthalate and polybutylene naphthalate; and a copolyester that contains 50% by weight or more of alkylene arylate units, preferably 60% by weight or more, and more preferably 75% or more by weight); a polyamide-series polymer (e.g., nylon 6, nylon 66); and a vinyl-series polymer (e.g., polyvinyl chloride, ethylene-vinyl acetate copolymer); a polyvinyl alcohol-series polymer (e.g., polyvinyl alcohol, ethylene-vinyl alcohol copolymer); and others.

The plastic film includes a film having inorganic layer formed in at least one side of the plastic film. The inorganic layer may be formed by vacuum evaporation, sputtering, and others. Exemplified as an inorganic substance constituting the inorganic layer is: an element such as Group 2A elements of the Periodic Table of Elements (e.g., magnesium), the transition metals of the Periodic Table of Elements (e.g., titanium, zirconium, gold), Group 2B elements of the Periodic Table of Elements (e.g., zinc), Group 3B elements of the Periodic Table of Elements (e.g., aluminum, indium), Group 4B elements of the Periodic Table of Elements (e.g., silicon, tin); or an inorganic compound including the above-described element(s) (e.g., an oxide, a halide, a carbide, a nitride). The preferred inorganic substance is aluminum, a metal oxide [e.g., tin oxide, aluminum oxide (alumina), indium oxide, or a composite oxide thereof], a silicon oxide [e.g., silicon monoxide, silicon dioxide (silica)], and others. In particular, a film obtained by vacuum evaporating aluminum, alumina or silica alone, or silica and alumina. Moreover, the inorganic layer may be transparent. The thickness of the inorganic layer is about 100 to 3,000 Å, preferably about 200 to 2,000 Å, and further preferably about 300 to 1,500Å.

Moreover, the plastic film may be a laminated film constructed of any co-extruded films and the above-described plastic film which are previously bonded together with another adhesive.

Furthermore, the film may form a gas-barrier resin layer such as a coating layer or laminated layer composed of an ethylene-vinyl alcohol copolymer, a vinylidene chloride-series copolymer. Moreover, the film may have a heat-sealable layer, an antistatic layer, a lubricious layer, an antiblocking layer, and others.

The plastic film may be a non-oriented film (non-oriented polyethylene, polypropylene, and others) or a uniaxially or biaxially oriented film (e.g., biaxially oriented polypropylene, polyalkylene terephthalate, nylon), and either will do.

The surface (the surface on which the adhesive composition is applied, or the surface on which the adhesive composition is not applied) of the plastic film may be subjected to surface treatment, for example, corona discharge treatment, or may be laminated a primer layer such as an anchor coat agent. Moreover, the plastic film may be subjected to printing.

The thickness of the plastic film is usually about 1 to 200 $\mu$m (e.g., about 5 to 200 $\mu$m), preferably about 5 to 150 $\mu$m, and more preferably about 10 to 100 $\mu$m (e.g., about 10 to 50 $\mu$m).

The metal foil includes spreadable metal foil (e.g., aluminum foil, gold foil). The thickness of the metal foil is, for example, 5 to 100 $\mu$m, preferably about 5 to 50 $\mu$m, and more preferably about 5 to 20 $\mu$m.

The adhesive composition of the present invention may be used for laminating or bonding at least two films. In the case that three or more (a plurality of) films are used, all films may be laminated with the composition.

Furthermore, in the lamination step, a coated surface obtained by coating the adhesive composition on a base film (the first film) may be provided with the second film (a plastic film or metal foil) as the non-molten or molten state. As a result, the base film and the second film may be laminated. In the most cases, the second film to be used is usually a film having different function from function of the base film. For example, in the case that the base film is $C_{2-4}$alkylene arylate-series resin film such as polyethylene terephthalate, the second film may be a polyolefinic resin film (e.g., a polyethylene-series resin film, a polypropylene-series resin film), a polyamide-series resin film, a polyvinyl alcohol-series resin film, metal foil, and others. The second film may construct a vacuum evaporated inorganic layer, and may be an oriented a or non-oriented film. Furthermore, the second film may be a heat-sealable film (e.g., a polyethylene-series resin film, a non-oriented polypropylene-series resin film, a copolyester-series resin film, a polyamide-series resin film).

In particular, the adhesive composition of the present invention is preferable to produce a composite laminated film comprising at least a polyalkylene arylate-series resin film [particularly, a poly$C_{2-4}$alkylene terephthalate-series resin film such as polyethylene terephthalate (PET)]. Usually, in the case that a solvent-free adhesive is used, the external appearance of the composite laminated film containing a polyalkylene arylate-series resin film makes worse. However, in the case that the adhesive composition of the present invention is used, both the initial external appearance and the external appearance after aging step is good in producing a composite laminated film which is laminated with a polyalkylene arylate-series resin film (e.g., a composite laminated film composed of an oriented PET film/aluminum foil, an oriented PET film/a non-oriented polypropylene film comprising vacuum evaporated aluminum, an oriented PET film/an oriented nylon film, and others) even when laminated at such high speed as 200 m/minute or more.

When applying (coating) the adhesive composition, it is preferred that the adhesive composition is heated at about 40 to 100° C. (preferably, about 40 to 90° C., and more preferably about 40 to 85° C.) until it acquires a suitable viscosity. The suitable viscosity is, at a given temperature within the above-mentioned range, about 200 to 5,000 mPa·s, preferably about 300 to 3,000 mPa·s, and more preferably about 400 to 2,000 mPa·s. If the temperature is above 100° C., before being coated, the adhesive composition begins to generate heat as a result of the reaction between the component (A) and the component (B) and gets viscous accelerating. This could lead to deterioration in external appearance.

The amount of the adhesive composition of the present invention to be applied is, in each laminating step, about 0.5 to 5 g/m², preferably about 0.7 to 3 g/m², and more preferably about 0.8 to 3 g/m² (in particular, 1 to 3 g/m²). In the case that the amount of the adhesive composition applied is too small, there cause the possibilities that its adhesive properties can not only be fully exhibited but also the external appearance is adversely affected. Moreover, in the case that the amount of the adhesive composition applied is too much, not only the external appearance is adversely affected, but also the adhesive seeps from the edge of the film, causing troubles in the production of a composite laminated film. In particular, even if a composite laminated film liable to deteriorate the external appearance (e.g., a composite laminated film containing the above-mentioned polyalkylene arylate-series resin film) is used, the adhesive composition of the present invention easily enables improvement of the external appearance of the film with such easy operation as adjustment of the amount of the adhesive composition to be coated (e.g., the amount is 1 to 3 g/m²)

The composite laminated film produced by the laminating process of the present invention is usually subjected to aging step under the following condition: about 20 to 60° C., preferably about 30 to 50° C.; for about one hour to 10 days, preferably about 1 to 5 days.

The composite laminated film obtained by such a process is strongly adhered to any kind of plastic films, metal foils, and others. As a result, the composite laminated film can be utilized in a variety of arts, for example various packaging materials that require gas -barrier property, water-resistance, chemical-resistance, and other properties.

INDUSTRIAL APPLICABILITY OF THE INVENTION

According to the present invention, a composite laminated film having the good external appearance can be produced simply and effectively. In particular, even if the film is laminated at high speed, a composite laminated film having the good external appearance at the time both immediately after laminating step and after aging step can be obtained. Therefore, after laminating step, quality of the composite laminated film at the time after aging step can be estimated easily, such that the efficiency of production of the composite film can be improved. Moreover, a composite film having the good external appearance can be obtained, even when a film having high rigidity is laminated.

EXAMPLES

The following examples are intended to describe this invention in further detail and should by no means be construed as defining the scope of the invention.

Production Example 1

Into a reactor were fed 330.27 g of dimethyl terephthalate, 847.66 g of isophthalic acid, 445.55 g of ethylene glycol, 121.01 g of neopentyl glycol, 411.92 g of 1,6-hexanediol and 0.21 g of zinc acetate, and the mixture was subjected to an esterification reaction in a stream of nitrogen at 180 to 220° C. After predetermined amounts of water and methanol had been distilled off, to the reaction product was added 320.12 g of azelaic acid, and the resultant mixture was subjected to an esterification reaction at 180 to 220° C. to give a polyester polyol "a".

Production Example 2

Into a reactor were fed 383.8 g of dimethyl terephthalate, 985.06 g of isophthalic acid, 498.94 g of ethylene glycol, 135.51 g of neopentyl glycol, 461.28 g of 1,6-hexanediol and 0.24 g of zinc acetate, and the mixture was subjected to an esterification reaction in a stream of nitrogen at 180 to 220° C. After predetermined amounts of water and methanol had been distilled off, to the reaction product was added 372.02 g of azelaic acid, and the resultant mixture was subjected to an esterification reaction at 180 to 220° C. to obtain a polyester polyol "b".

Production Example 3

Into a reactor were fed 946.21 g of isophthalic acid, 309.59 g of ethylene glycol, 299.4 g of neopentyl glycol, 440.96 g of 1,6-hexanediol and 0.2 g of zinc acetate, and the mixture was subjected to an esterification reaction in a stream of nitrogen at 180 to 220° C. After predetermined amounts of water had been distilled off, to the reaction product was added 277.45 g of adipic acid, and the resultant mixture was subjected to an esterification reaction at 180 to 220° C. to give a polyester polyol "c".

Production Example 4

Into a reactor were fed 1196.61 g of adipic acid, 1131.35 g of 1,3-butanediol and 0.2 g of zinc acetate, and the mixture was subjected to an esterification reaction in a stream of nitrogen at 160 to 220° C. to obtain a polyester polyol "d".

Production Example 5

Into a reactor were fed 178.6 g of isophthalic acid, 211.86 g of 1,6-hexanediol, 399.28 g of 1,3-butanediol, 734.2 g of trifunctional polypropylene glycol having molecular weight of about 1,000 (manufactured by Takeda Chemical Industries, Ltd., Actcol 32-160) and 0.22 g of zinc acetate, and the mixture was subjected to an esterification reaction in a stream of nitrogen at 180 to 220° C. After the predetermined amount of water had been distilled off , to the reaction product was added 650.42 g of adipic acid, 181.49 g of 1,4-butanediol and 38.05 g of diethylene glycol, and the resultant mixture was subjected to an esterification reaction at 180 to 220° C. to give a polyester polyol "e".

Production Example 6

Into a reactor were fed 254.69 g of isophthalic acid, 570.01 g of 1,3-butanediol, 302.45 g of 1,6-hexanediol and 0.2 g of zinc acetate, and the mixture was subjected to an esterification reaction in a stream of nitrogen at 180 to 220° C. After the predetermined amount of water had been distilled off, to the reaction product was added 927.55 g of adipic acid and 259.09 g of 1,4-butanediol, and the resultant mixture was subjected to an esterification reaction at 180 to 220° C. to obtain a polyester polyol "f".

Production Example 7

Into a reactor were fed 671.48 g of isophthalic acid, 1059.76 g of 1,3-butanediol and 0.2 g of zinc acetate, and the mixture was subjected to an esterification reaction in a stream of nitrogen at 180 to 220° C. After the predetermined amount of water had been distilled off, to the reaction product was added 590.68 g of adipic acid, and the resultant mixture was subjected to an esterification reaction at 180 to 220° C. to give a polyester polyol "g".

Production Example 8

Into a reactor were fed 720.68 g of isophthalic acid, 193.96 g of ethylene glycol, 262.28 g of neopentyl glycol, 378.76 g of 1,6-hexanediol, 150.14 g of diethylene glycol and 0.18 g of zinc acetate, and the mixture was subjected to an esterification reaction in a stream of nitrogen at 180 to 220° C. After predetermined amounts of water had been distilled off, to the reaction product was added 326.6 g of azelaic acid, and the resultant mixture was subjected to an esterification reaction at 180 to 220° C. to obtain a polyester polyol "h".

Production Example 9

Into a reactor were fed 1196.61 g of adipic acid, 1131.35 g of 1,4-butanediol and 0.2 g of zinc acetate, and the mixture was subjected to an esterification reaction in a stream of nitrogen at 180 to 220° C. to give a polyester polyol "i" being crystalline at room temperature.

Production Example 10

Into a reactor were fed 647.81 g of isophthalic acid, 1095.22 g of 1,3-butanediol and 0.2 g of zinc acetate, and the mixture was subjected to an esterification reaction in a stream of nitrogen at 180 to 220° C. After the predetermined amount of water had been distilled off, to the reaction product was added 569.86 g of adipic acid, and the resultant mixture was subjected to an esterification reaction at 180 to 220° C. to obtain a polyester polyol "j".

Production Example 11

To a reactor were fed 292.5 g of the polyester polyol "h" obtained in Production Example 8 and 1223.21 g of xylylene diisocyanate, and the mixture was subjected to a urethanization reaction in a stream of nitrogen at 70 to 80° C. Thereafter, xylylene diisocyanate left unreacted was removed from the reaction product by Smith distillation (i.e., a known removal operation, such as a removal operation that after the urethanization reaction, the unreacted diisocyanate are removed under a reduced pressure) to give a polyisocyanate "k".

Production Example 12

99.54 g of diethylene glycol, 1250.68 g of butylene adipate being crystalline at room temperature and having molecular weight of about 1,000 (manufactured by Takeda Chemical Industries, Ltd., Takelac U-2410), 328.3 g of trifunctional polypropylene glycol having molecular weight of about 1,000 (manufactured by Takeda Chemical Industries, Ltd., Actcol 32-160), and 250.14 g of bifunctional polypropylene glycol having molecular weight of about 400 (manufactured by Takeda Chemical Industries, Ltd., Acteol P-400) were mixed together in a stream of nitrogen at 700° C. to uniformity to obtain a polyol component "m".

Production Example 13

687.24 g of the polyester polyol "d" obtained in Production Example 4, 55.1 g of diethylene glycol, 763.6 g of butylene adipate being crystalline at room temperature and having molecular weight of about 1,000 (manufactured by Takeda Chemical Industries, Ltd., Takelac U-2410), and 416.92 g of trifunctional polypropylene glycol having molecular weight of about 1,000 (manufactured by Takeda Chemical Industries, Ltd., Actcol 32-160) were mixed together in a stream of nitrogen at 70° C. homogeneously to give a polyol component "n".

Production Example 14

805.15 g of the polyester polyol "f" obtained in Production Example 6, 73.29 g of diethylene glycol, 784.75 g of butylene adipate being crystalline at room temperature and having molecular weight of about 1,000 (manufactured by Takeda Chemical Industries, Ltd., Takelac U-2410), and 263.68 g of trifunctional polypropylene glycol having molecular weight of about 1,000 (manufactured by Takeda Chemical Industries, Ltd., Actcol 32-160) were mixed together in a stream of nitrogen at 70° C. homogeneously to obtain a polyol component "p".

Production Example 15

1099.9 g of the polyester polyol "g" obtained in Production Example 7, 48.63 g of diethylene glycol, 458.29 g of butylene adipate being crystalline at room temperature and having molecular weight of about 1,000 (manufactured by Takeda Chemical Industries, Ltd., Takelac U-2410), and 320.8 g of trifunctional polypropylene glycol having molecular weight of about 1,000 (manufactured by Takeda Chemical Industries, Ltd., Actcol 32-160) were mixed together in a stream of nitrogen at 70° C. homogeneously to give a polyol component "q"

Production Example 16

To a reactor were fed 214.15 g of the polyester polyol "j" obtained in Production Example 10, 557.6 g of bifunctional polypropylene glycol having molecular weight of about 1,000 (manufactured by Takeda Chemical Industries, Ltd., Takelac P-22), 97.58 g of trifunctional polypropylene glycol having molecular weight of about 1,000 (manufactured by Takeda Chemical Industries, Ltd., Actcol 32-160), 278.8 g of butylene adipate being crystalline at room temperature and having molecular weight of about 1,000 (manufactured by Takeda Chemical Industries, Ltd., Takelac U-2410) and 139.54 g of diphenylmethane diisocyanate, and the mixture was subjected to a urethanization reaction in a stream of nitrogen at 70 to 80° C. to obtain a polyol component "r", which is a polyurethane polyol.

Production Example 17

300 g of the polyisocyanate "k" obtained in Production Example 11 and 200 g of the polyisocyanate which is a modified polymeric or oligomeric aliphatic polyisocyanate (manufactured by Takeda Chemical Industries, Ltd., Takenate D-177N) were mixed together in a stream of nitrogen at 70° C. homogeneously to give a polyisocyanate component "A".

Production Example 18

To a reactor were fed 632.12 g of xylylene diisocyanate, 839.75 g of butylene adipate being crystalline at room temperature and having molecular weight of about 1,000 (manufactured by Takeda Chemical Industries, Ltd., Takelac U-2410), 89.12 g of diethylene glycol and 0.06 g of benzoyl chloride, and the mixture was subjected to a urethanization reaction in a stream of nitrogen at 70 to 80° C. After the reaction was complete, to the reaction product was added 390.25 g of the polyisocyanate which is a modified polymeric or oligomeric aliphatic polyisocyanate (manufactured by Takeda Chemical Industries, Ltd., Takenate D-170N), and mixed together in a stream of nitrogen at 70 to 80° C. homogeneously to obtain a polyisocyanate component "B".

Production Example 19

To a reactor were fed 582.94 g of xylylene diisocyanate, 968.02 g of butylene adipate being crystalline at room temperature and having molecular weight of about 1,000 (manufactured by Takeda Chemical Industries, Ltd., Takelac U-2410), 102.73 g of diethylene glycol and 0.06 g of benzoyl chloride, and the mixture was subjected to a urethanization reaction in a stream of nitrogen at 70 to 80° C. After the reaction was complete, to the reaction product was added 291.88 g of the polyisocyanate which is a modified polymeric or oligomeric aliphatic polyisocyanate (manufactured by Takeda Chemical Industries, Ltd., Takenate D-170HN), and mixed together in a stream of nitrogen at 70 to 80° C. homogeneously to give a polyisocyanate component "C".

Production Example 20

To a reactor were fed 641.07 g of xylylene diisocyanate, 454.21 g of butylene adipate being crystalline at room temperature and having molecular weight of about 1,000 (manufactured by Takeda Chemical Industries, Ltd., Takelac U-2410), 144.61 g of diethylene glycol, 317.95 g of trifunctional polypropylene glycol having molecular weight of about 1,000 (manufactured by Takeda Chemical Industries, Ltd., Actcol 32-160) and 0.06 g of benzoyl chloride, and the mixture was subjected to a urethanization reaction in a stream of nitrogen at 70 to 80° C. After the reaction was complete, to the reaction product was added 389.46 g of the polyisocyanate which is a modified polymeric or oligomeric aliphatic polyisocyanate (manufactured by Takeda Chemical Industries, Ltd., Takenate D-170HN), and mixed together in a stream of nitrogen at 70 to 80° C. homogeneously to obtain a polyisocyanate component "D".

Production Example 21

To a reactor were fed 630.22 g of xylylene diisocyanate, 837.23 g of butylene adipate being crystalline at room temperature and having molecular weight of about 1,000 (manufactured by Takeda Chemical Industries, Ltd., Takelac U-2410), 88.85 g of diethylene glycol and 0.06 g of benzoyl chloride, and the mixture was subjected to a urethanization reaction in a stream of nitrogen at 70 to 80° C. After the reaction was complete, to the reaction product was added 389.07 g of the polyisocyanate which is a modified polymeric or oligomeric aliphatic polyisocyanate (manufactured by Takeda Chemical Industries, Ltd., Takenate D-170HN), and mixed together in a stream of nitrogen at 70 to 80° C. homogeneously to give a polyisocyanate component "E".

Production Example 22

To a reactor were fed 648.81 g of xylylene diisocyanate, 377.09 g of polyester polyol "i" obtained in Production Example 9, 57.17 g of diethylene glycol, 301.68 g of trifunctional polypropylene glycol having molecular weight of about 1,000 (manufactured by Takeda Chemical Industries, Ltd., Actcol 32-160), 172.39 g of bifunctional polypropylene glycol having molecular weight of about 400 (manufactured by Takeda Chemical Industries, Ltd., Actcol P-400 and 0.06 g of benzoyl chloride, and the mixture was subjected to a urethanization reaction in a stream of nitrogen at 70 to 80° C. After the reaction was complete, to the reaction product was added 389.28 g of the polyisocyanate which is a modified polymeric or oligomeric aliphatic polyisocyanate (manufactured by Takeda Chemical Industries, Ltd., Takenate D-170HN), and mixed together in a stream of nitrogen at 70 to 80° C. homogeneously to obtain a polyisocyanate component "F".

Production Example 23

To a reactor were fed 607.05 g of xylylene diisocyanate, 672.04 g of butylene adipate being crystalline at room temperature and having molecular weight of about 1,000 (manufactured by Takeda Chemical Industries, Ltd., Takelac U-2410), 118.86 g of diethylene glycol, 156.81 g of trifunctional polypropylene glycol having molecular weight of about 1,000 (manufactured by Takeda Chemical Industries, Ltd., Actcol 32-160) and 0.06 g of benzoyl chloride, and the mixture was subjected to a urethanization reaction in a stream of nitrogen at 70 to 80° C. After the reaction was complete, to the reaction product was added 388.69 g of the polyisocyanate which is a modified polymeric or oligomeric aliphatic polyisocyanate (manufactured by Takeda Chemical Industries, Ltd., Takenate D-170HN), and mixed together in a stream of nitrogen at 70 to 80° C. homogeneously to give a polyisocyanate component "G".

Production Example 24

To a reactor were fed 675.33 g of xylylene diisocyanate, 434.99 g of butylene adipate being crystalline at room temperature and having molecular weight of about 1,000 (manufactured by Takeda Chemical Industries, Ltd., Takelac U-2410), 138.48 g of diethylene glycol, 304.49 g of trifunctional polypropylene glycol having molecular weight of about 1,000 (manufactured by Takeda Chemical Industries, Ltd., Actcol 32-160) and 0.06 g of benzoyl chloride, and the mixture was subjected to a urethanization reaction in a stream of nitrogen at 70 to 80° C. After the reaction was complete, to the reaction product was added 388.32 g of the polyisocyanate which is a modified polymeric or oligomeric aliphatic polyisocyanate (manufactured by Takeda Chemical Industries, Ltd., Takenate D-170HN), and mixed together in a stream of nitrogen at 70 to 80° C. homogeneously to obtain a polyisocyanate component "H".

Production Example 25

To a reactor were fed 556.76 g of diphenylmethane diisocyanate, 321.5 g of bifunctional polypropylene glycol having molecular weight of about 2,000 (manufactured by Takeda Chemical Industries, Ltd., Takelac P-21), 208.11 g of a polyol that is bifunctional ethylene oxide-propylene oxide copolymer having molecular weight of about 2,000 (manufactured by Takeda Chemical Industries, Ltd., Takelac P-24), 112.53 g of trifunctional polypropylene glycol having molecular weight of about 1,000 (manufactured by Takeda Chemical Industries, Ltd., Actcol 32-160), 47.65 g of trifunctional polypropylene glycol having molecular weight of about 500 (manufactured by Takeda Chemical Industries, Ltd., Actcol G-530) and 0.04 g of benzoyl chloride, and the mixture was subjected to a urethanization reaction in a stream of nitrogen at 70 to 80° C. to give a polyisocyanate component "J".

[Examples and Comparative Examples]

The polyester polyols "a", "b", "c" and "e" obtained in the above Production Examples, the polyol components "m", "n", "p", "q" and "r" obtained in the above Production Examples, the following polyol component "s", the polyisocyanate components "A" to "H" and "J", the following polyisocyanate components "K" and "L", as well as the following various additives were blended in proportions shown in Tables 1 and 2 to prepare adhesives for lamination. Thereafter, using the adhesives for lamination thus obtained, composite films were fabricated in the following manner. From the viewpoint of the external appearance, each composite film was evaluated in the following manner. The results are shown in Tables 1 and 2.

[Polyol Components]

Polyol component "s": poly-$\epsilon$-caprolactonediol being crystalline at room temperature and having molecular weight of about 2,000 (manufactured by Daicel Chemical Industries, Ltd., Placcel 220N).

[Polyisocyanate Components]

Polyisocyanate component "K": manufactured by Takeda Chemical Industries, Ltd., Takenate A-65

Polyisocyanate component "L": aliphatic trifunctional polyisocyanate compound (manufactured by Nippon Polyurethane Industry Co., Ltd., Coronate HX)

[Additives]

Silicone oil (antifoaming agent): manufactured by Dow Corning Toray Silicone Co., Ltd., SH200 350cs)

Epoxy resin: manufactured by Mitsui Chemicals, Inc., EPOMIK R-302

Silane coupling agent 1: manufactured by Shin-etsu Kagaku Kogyo, K.K., KBE-403

Silane coupling agent 2: manufactured by Shin-etsu Kagaku Kogyo, K.K., KBE-603

Phosphoric acid: manufactured by Wako Pure Chemicals Industries, Ltd.

[Fabrication of Composite Laminated Films]

A composite film composed of two layers, one of the PET film and the other of aluminum foil, was fabricated by the following steps:

applying each of the adhesives for lamination of Examples and Comparative Examples onto a white-printed PET film (thickness: 12 $\mu$m, printed ink: manufactured by Toyo Ink Mfg. Co., Ltd., NEW LP super R630 white one-component type) using a laminating machine for solvent-free adhesives (manufactured by Okazaki Machine Industry Co., Ltd., TNS-400-200) at 200 m/minute of a lamination speed such that the amount of the adhesive applied was 1.8 to 2.2 g/m$^2$; and bonding the film thus applied and about 100 of aluminum foil (thickness: 15 $\mu$m) together.

[Evaluation of the External Appearance]

The external appearance of the composite laminated film thus obtained was observed immediately after lamination step. Then, the roll of the resultant film was subjected to aging step at 40° C. for two days. After the aging step was complete, thirty meters of the composite laminated film was unwound from the roll, the external appearance of the unwound area was observed to evaluate the external appearance of the film after aging step. The external appearance was evaluated based on the following criteria. Incidentally, "the external appearance at the time immediately after lamination" means the external appearance observed at not more than 5 minutes after the lamination step is completed.

(The External Appearance of the Film at the Time Immediately After Lamination)

I: There were small dots that did not look wet.

III: There were large dots that did not look wet.

(The External Appearance of the Film at the Time After Aging Step)

I: The external appearance was good with wetting uniformly.

II: With wetting uniformly, there were few dots that did not look wet.

III: There were many dots that did not look wet.

TABLE 1

| | | | | Examples | | | | | |
|---|---|---|---|---|---|---|---|---|---|
| | | 1 | 2 | 3 | 4 | 5 | 6 | 7 | 8 |
| polyol component | | b | n | e | e | e | e | p | q |
| (parts by weight) | | 100 | 100 | 100 | 100 | 100 | 100 | 100 | 100 |
| antifoaming agent | | 0.1 | 0.1 | 0.05 | 0.05 | 0.05 | — | 0.05 | 0.05 |
| (parts by weight) | | | | | | | | | |
| additives | epoxy resin | — | — | — | — | — | — | — | — |
| (parts | coupling agent 1 | 1 | 1 | 1 | 1 | 1 | 1 | 1 | 1 |
| by | coupling agent 2 | 0.5 | — | — | — | — | — | — | — |
| weight) | phosphoric acid | 0.05 | 0.05 | 0.05 | 0.05 | 0.05 | 0.05 | 0.05 | 0.05 |
| polyisocyanate component | | B | F | F | D | E | E | G | E |
| (parts by weight) | | 90 | 154 | 154 | 154 | 154 | 154 | 154 | 167 |
| viscosity at 70° C. (mPa · s) | immediately after | 1400 | 460 | 650 | 800 | 500 | 500 | 640 | 490 |
| | 10 minutes after | 2100 | 640 | 900 | 1050 | 670 | 670 | 880 | 670 |
| content of crystalline component (%) | | 20.4 | 27.2 | 11.7 | 14.1 | 26.1 | 26.1 | 36.8 | 35.7 |
| concentration of aromatic ring (mmol/g) | | 2.52 | 1.07 | 1.27 | 1.25 | 1.24 | 1.24 | 1.13 | 1.50 |
| the external appearance immediately after lamination | | I | I | I | I | I | I | I | I |
| the external appearance after aging | | I | I | I | I | I | I | I | I |

TABLE 2

|  |  | Examples | | | Comparative Examples | | | |
| --- | --- | --- | --- | --- | --- | --- | --- | --- |
|  |  | 9 | 10 | 11 | 1 | 2 | 3 | 4 |
| polyol component | | q | q | r | a | c | m | s |
| (parts by weight) | | 100 | 100 | 100 | 100 | 100 | 100 | 100 |
| antifoaming agent | | 0.05 | 0.05 | 0.15 | 0.1 | — | 0.1 | — |
| (parts by weight) | | | | | | | | |
| additives | epoxy resin | — | — | — | 1 | — | — | — |
| (parts | coupling agent 1 | 1 | 1 | 0.5 | 0.5 | 1.5 | 1 | — |
| by | coupling agent 2 | — | — | — | 0.2 | 0.5 | — | — |
| weight) | phosphoric acid | 0.05 | 0.05 | 0.1 | 0.05 | 0.05 | 0.05 | — |
| polyisocyanate component | | D | H | J | A | K | C | L |
| (parts by weight) | | 167 | 167 | 80 | 65 | 50 | 154 | 20 |
| viscosity immediately | | 660 | 660 | 790 | 1860 | 660 | 650 | 350 |
| at 70° C. after | | | | | | | | |
| (mPa·s) 10 minutes after | | 910 | 910 | 1600 | 2570 | 850 | 910 | 400 |
| content of crystalline component (%) | | 23.4 | 22.8 | 11.9 | 0 | 0 | 55.4 | 83.3 |
| concentration of aromatic ring (mmol/g) | | 1.52 | 1.58 | 2.25 | 2.89 | 2.08 | 0.965 | 0 |
| the external appearance immediately after lamination | | I | I | I | III | III | I | I |
| the external appearance after aging | | I | I | I | III | II | II | III |

As apparent from Tables 1 and 2, the adhesive composition of the present invention enables of the composite laminated film having the good external appearance at the time both immediately after lamination and after aging step. However, the composite laminated film fabricated by using the comparative adhesive composition shows appearance of dots in at least one of the time immediately after lamination and the time after aging step. As a result, the external appearance of the film is adversely affected.

What is claimed is:

1. A method for laminating films at a high lamination speed using a solvent-free two-component curable adhesive composition, which comprises:
    applying the solvent-free two-component curable adhesive composition to first film at a high lamination speed of 150 m/minute or more,
    wherein the adhesive composition comprises (A) a polyol component and (B) a polyisocyanate component, and
    at least one component of the components (A) and (B) comprises at least one polyol component having crystallinity at room temperature and is selected from the group consisting of a polyester polyol, a polyether polyol, a polycarbonate polyol and a polyurethane polyol, and an amount of the crystalline polyol component is 3 to 50% by weight relative to the to weight of the components (A) and (B),
    the adhesive composition has an initial viscosity of 100 to 1.500 mPa·s at 70° C. immediately after the components (A) and (B) are mixed. and an increasing ratio of the viscosity after the mixture stands at 70° C. for 10 minutes is 120% or less relative to the initial viscosity,
    at least one of the components (A) and (B) contains aromatic rings, and the aromatic rings are present in a concentration of 0.2 to 2.8 mmol/g based upon the total weight of the components (A) and (B), and
    bonding the adhesive applied film to a second film at a the high lamination speed.

2. The method according to claim 1, wherein the adhesive composition has an initial viscosity of 100 to 1,000 mPa·s at 70° C. immediately aft the components (A) and (B) are mixed, and an increasing ratio of the viscosity after the mixture stands at 70° C. for 10 minutes is 120% or less relative to the initial viscosity.

3. The method according to claim 1, wherein the component (A) at least comprises polyester polyol obtained from at least one polybasic acid selected from the group consisting of an aromatic dicarboxylic acid and an aliphatic dicarboxylic acid, and at least one polyol component selected from the group consisting of an alkanepolyol and a polyether polyol.

4. The method according to claim 3, wherein the component (A) further comprises at least one polyol component selected from the group consisting of an alkanepolyol and a polyether polyol.

5. The method according to claim 1, wherein the component (B) has a plurality of terminal isocyanate groups and is at least one member selected from the group consisting of the following (B1) and (B2):
    (B1) a reaction product of a polyisocyanate and at least one polyol component selected from the group consisting of an alkanepolyol, a polyester polyol, a polyether polyol, a polycarbonate polyol and a polyurethane polyol; and
    (B2) a polyisocyanate derivative.

6. The method according to claim 5, the polyisocyanate of the component (B1) is at least one member selected from the group consisting of an araliphatic diisocyanate and a biphenyl-series diisocyanate.

7. The method according to claim 5, wherein the polyisocyanate of the component (B1) is at least one member selected from the group consisting of an xylylene diisocyanate and a diphenylmethane diisocyanate.

8. The method according to claim 5, wherein the (B2) is at least one member selected from the group consisting of a polymeric or oligomeric aliphatic diisocyanate, a modified aliphatic diisocyanate, and a modified polymeric or oligomeric aliphatic diisocynate.

9. The method according to claim 5, wherein the component (B2) is at least one member selected from the group consisting of a polymeric or oligomeric hexamethylene diisocyanate, a modified hexamethylene diisocyanate, and a modified polymeric or oligomeric hexamethylene diisocyanate.

10. The method according to claim 1, wherein the crystalline polyol component comprises at least one member selected from the following (i) and (ii):

(i) a polyester polyol having a number average molecular weight of 400 to 5,000, and is obtained from at least one member selected from the group consisting of an aromatic dicarboxylic acid and an aliphatic dicarboxylic acid, and at least one polyol component selected from the group consisting of an alkanepolyol and a polyether polyol; and (ii) a polyether polyol having a number average molecular weight of 400 to 5,000.

11. The method according to claim 1, wherein the adhesive composition further comprises at least one member selected from the group consisting of an antifoaming agent and a foam stabilizer.

12. The method according to claim 1, wherein the adhesive composition further comprises an adhesion improving agent.

13. The method according to claim 12, wherein the adhesion improving agent is at least one member selected from the group consisting of a coupling agent, an oxygen acid of phosphorous, and an epoxy compound or resin.

14. The method according to claim 1, wherein at least one of the first and second films is a polyalkylene arylate-series resin film.

15. The method according to claim 1, wherein the lamination speed is 200 m/minute or more.

16. A method for laminating films at a high lamination speed using a solvent-free two-component curable adhesive composition, which comprises:

applying the solvent-free two-component curable adhesive composition to first film at a high lamination speed of 150 m/minute or more, wherein the adhesive composition comprises:

(A) a polyol component which comprises a crystalline polyester diol having a number average molecular weight of 400 to 4,000 and is obtained from a polybasic acid comprising an aliphatic dicarboxylic acid and at least one diol selected from the group consisting of an alkanediol and a polyether diol; and (B) a polyisocyanate component, wherein the composition contains the crystalline polyester dial in a proportion of 3 to 45% by weight relative to the total weight of the components (A) and (B), and has initial viscosity of 200 to 1,500 mPa·s at 70° C. immediately after the component (A) and (B) are mixed, an increasing ratio of the viscosity after the mixture stands at 70° C. for 10 minutes the initial viscosity of 110% or less, and at least one of the components (A) and (B) contains aromatic rings, and the of aromatic rings are present in a concentration of 0.4 to 2.6 mmol/g based upon the total weight of the components (A) and (B), and bonding the adhesive applied film to a second film at the high lamination speed.

* * * * *

UNITED STATES PATENT AND TRADEMARK OFFICE
CERTIFICATE OF CORRECTION

PATENT NO. : 6,833,044 B2
DATED : December 21, 2004
INVENTOR(S) : Akihiro IMAI et al.

It is certified that error appears in the above-identified patent and that said Letters Patent is hereby corrected as shown below:

Column 21,
Line 40, after "to" insert -- a --;
Line 50, change "to" (second occurrence) to -- total --;
Line 53, change "." to -- , --;
Line 60, delete "a" (second occurrence);
Line 64, delete "."; and change "aft" to -- after --;

Column 22,
Line 48, before "the" insert -- wherein --.
Line 54, change "an" to -- a --;
Line 56, before "(B2)" insert -- component --;
Line 58, change "diisocynate" to -- diisocyanate --;

Column 24,
Line 16, change "dial" to -- diol --;
Line 17, after "has" insert -- an --;
Line 24, delete "of".

Signed and Sealed this

Seventh Day of June, 2005

JON W. DUDAS
*Director of the United States Patent and Trademark Office*